(12) United States Patent
Dickerson

(10) Patent No.: US 8,861,983 B2
(45) Date of Patent: Oct. 14, 2014

(54) ANALOG RADIO FREQUENCY TRANSPORT OVER OPTICAL MEDIA USING CONTINUOUS OPTICAL PHASE MODULATION AND NONCOHERENT DETECTION

(75) Inventor: Michael J. Dickerson, Frederick, MD (US)

(73) Assignee: 3 Phoenix, Inc., Chantilly, VA (US)

( * ) Notice: Subject to any disclaimer, the term of this patent is extended or adjusted under 35 U.S.C. 154(b) by 340 days.

(21) Appl. No.: 13/028,804

(22) Filed: Feb. 16, 2011

(65) Prior Publication Data
US 2012/0207482 A1    Aug. 16, 2012

(51) Int. Cl.
*H04B 10/152* (2006.01)

(52) U.S. Cl.
USPC .............................. 398/212; 398/202; 398/115

(58) Field of Classification Search
None
See application file for complete search history.

(56) References Cited

U.S. PATENT DOCUMENTS

| | | | |
|---|---|---|---|
| 3,868,589 A * | 2/1975 | Wang | 372/96 |
| 3,936,764 A | 2/1976 | Fischman et al. | |
| 5,253,309 A | 10/1993 | Nazarathy et al. | |
| 6,115,162 A | 9/2000 | Graves et al. | |
| 6,191,878 B1 * | 2/2001 | Spivey et al. | 398/212 |
| 6,510,255 B2 | 1/2003 | Masuda et al. | |
| 6,643,417 B2 | 11/2003 | Strutz et al. | |
| 6,996,345 B1 | 2/2006 | Chen | |
| 7,599,711 B2 | 10/2009 | Hermel et al. | |
| 7,660,491 B2 | 2/2010 | Thaniyavarn | |
| 2003/0030868 A1 * | 2/2003 | Sasai et al. | 359/154 |
| 2004/0037565 A1 | 2/2004 | Young et al. | |
| 2007/0291777 A1 * | 12/2007 | Jamieson et al. | 370/401 |
| 2009/0074421 A1 * | 3/2009 | Thaniyavarn | 398/116 |
| 2009/0214200 A1 * | 8/2009 | Webb et al. | 398/25 |
| 2010/0111540 A1 * | 5/2010 | Caplan et al. | 398/140 |

FOREIGN PATENT DOCUMENTS

| | | |
|---|---|---|
| CN | 102324976 A | 1/2012 |
| WO | WO 2008/024183 A2 | 2/2008 |

OTHER PUBLICATIONS

Guy, N.K., The Photographer's Dictionary, Apr. 5, 2002, Rotovision.*

Kartalopoulos, Stamatios V. "Introduction to DWDM technology: data in a rainbow," publication year 2000, Wiely-IEEE Press, pp. 71, and 86.*

Fei Zeng ; Jianping Yao; Frequency domain analysis of fiber bragg grating based phase modulation to intensity modulation conversion. Proc. SPIE 5971, Photonic Applications in Nonlinear Optics, Nanophotonics, and Microwave Photonics, 59712B (Oct. 5, 2005).*

(Continued)

*Primary Examiner* — Ken Vanderpuye
*Assistant Examiner* — Merlin Brito Peguero
(74) *Attorney, Agent, or Firm* — Sulzer, Green & Taylor, PLLC

(57) ABSTRACT

Analog transport of a wideband RF signal is effectively and efficiently provided using a coherent, narrowband optical carrier. The wideband RF signal is phase modulated onto the carrier at a first location. Non-coherent discrimination is applied to the modulated carrier at a second, different location to generate an amplitude modulated optical signal where the amplitude modulation represents the original wideband RF signal. A photo-detector is then used to regenerate a representation of the original wideband RF signal. The method and apparatus of the invention can be applied in systems dedicated to the analog RF transport or in wavelength division multiplexed systems which also provide transport for other analog or digital data.

54 Claims, 8 Drawing Sheets

(56) References Cited

OTHER PUBLICATIONS

Kartalopoulos, Stamatios V. "Introduction to DWDM Technology: Data in a Rainbow," publication year 2000, Wiely-IEEE Press, pp. 71-74, 80 and 81.*
Rajiv Ramaswami, Kumar Sivarajan, and Galen Sasaki. 2009. Optical Networks: A Practical Perspective, 3rd Edition (3rd ed.). Morgan Kaufmann Publishers Inc., San Francisco, CA, USA, pp. 138, and 167-171.*
Kiasaleh, "An All Optical Coherent Receiver for Self-homodyne Detection of Digitally Phase Modulated Optical Signals", IEEE, Transactions on Communications, vol. 42, No. 2/3/4, Feb.-Apr. 1994; pp. 1496-1500.
LaGasse et al, "Bias-Free High Dynamic-Range Phase-Modulated Fiber-Optic Link" appearing in IEEE Photonics Technology Letters, vol. 9, No. 5, May 1997, pp. 681-683.
Dickerson, "High-speed modulator testing overcomes challenges of chirp", WDM Solutions, Dec. 2001; pp. 23-30.
Gopalakrishnan et al, "Performance and Modeling of Broadband $LiNbO_3$ Traveling Wave Optical Intensity Modulators" Journal of Lightwave Technology, vol. 12 No. 10, Oct. 1994, pp. 1807-1819.
Covega Corp. Mach-10 053/065: 10G Phase Modulator, 2008.
Covega Corp. Mach-40 027/066; 40Gb/s Phase Modulator, 2008.
Cox III, et. al., "Techniques and Performance of Intensity-Modulated Direct-Detection Analog Optical Links," *IEEE Transactions on Microwave Theory and Techniques,* vol. 45, No. 8, Aug. 1997, pp. 1375-1383.
Djupsjöbacka, "A Linearization Concept for Integrated-Optic Modulators," *IEEE Photonics Technology Letters,* vol. 4, No. 8, Aug. 1992, pp. 869-872.
Gallo et al., "Comparison of Series and Parallel Optical Modulators for Microwave Down-Conversion," *IEEE Photonics Technology Letters,* vol. 10, No. 11, Nov. 1998, pp. 1623-1625.
Hill et al., "Fiber Bragg Grating Technology Fundamentals and Overview," *IEEE Journal of Lightwave Technology,* vol. 15, No. 8, Aug. 1997, pp. 1263-1276.
Namgoong, "A Channelized Ultrawideband Digital Receiver," *IEEE Transactions on Wireless Communications,* vol. 2, No. 3, May 2003, pp. 502-510.
Wooten, et. al., "Review of Lithium Niobate Modulators for Fiber-Optic Communication Systems," *IEEE Journal of Selected Topics in Quantum Electronics,* vol. 6, No. 1, Jan./Feb. 2000, pp. 69-82.
Bulmer et al., "Linear Interferometric Modulators in Ti:LiNbO3," *IEEE Journal of Lightwave Technology,* vol. LT-2, No. 4, Aug. 1984, pp. 512-521.
"Thin films improve 50-GHz DWDM devices", Laser Focus World Magazine, May 2002 (4 pgs.).
Wavelength References, "C-Band Wavelength Calibrator Hydrogen Cyanide Gas Cell H13C14N", sales@wavelengthreferences.com (2 pgs.).

* cited by examiner

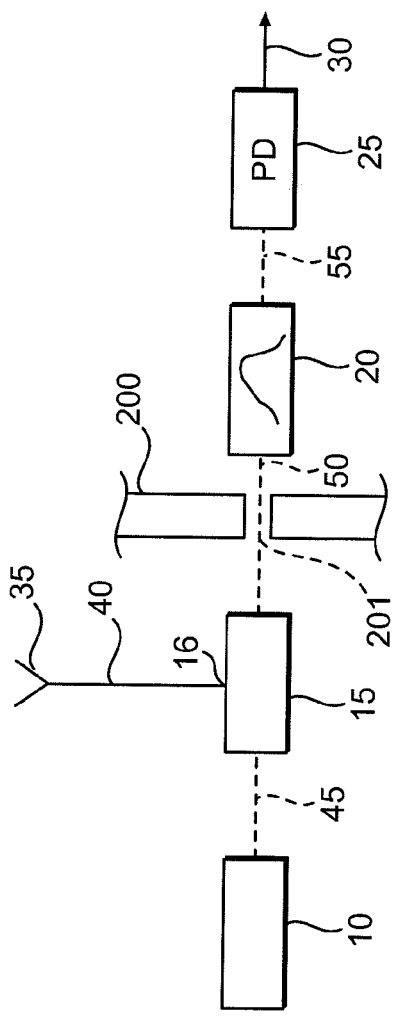
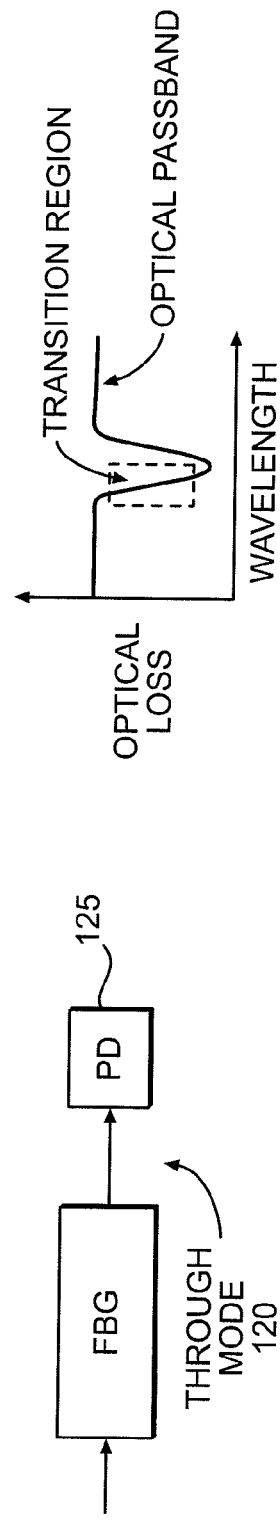
FIG. 1
FIG. 2A
FIG. 2B

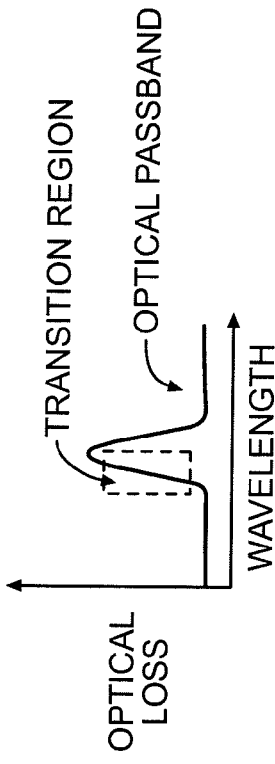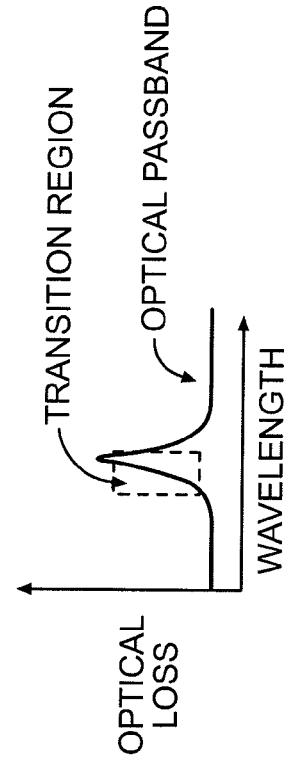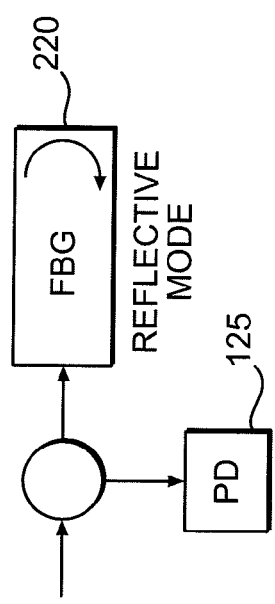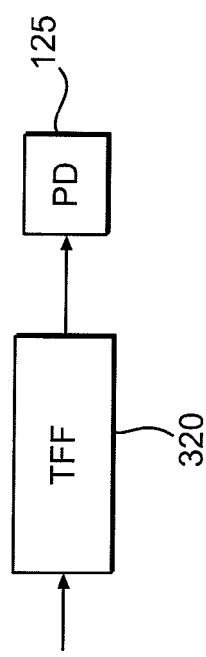

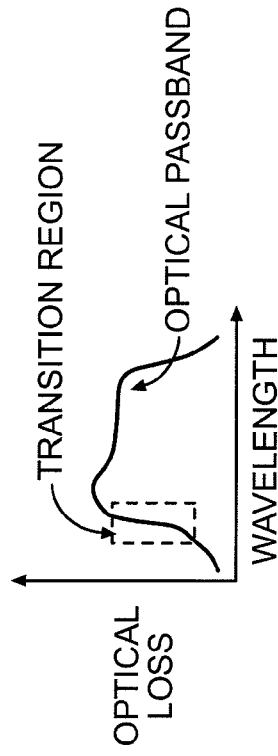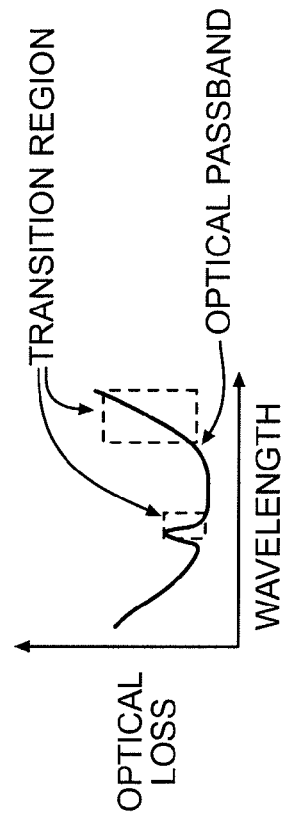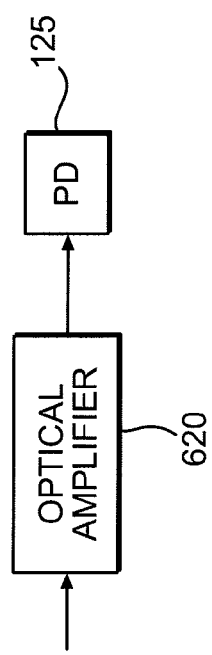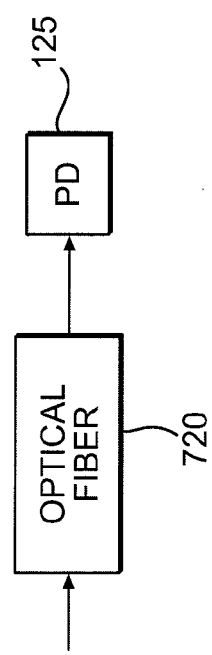
FIG. 7B
FIG. 8B
FIG. 7A
FIG. 8A

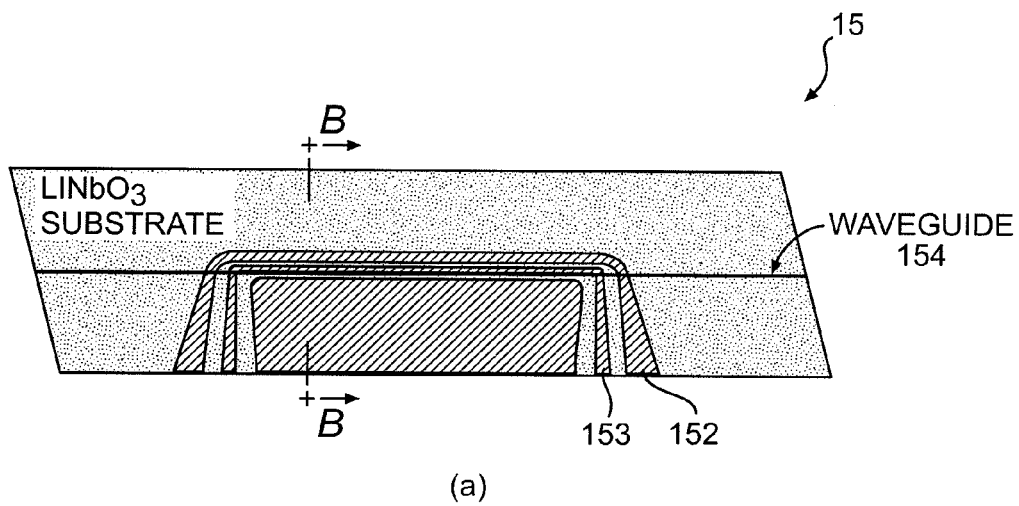
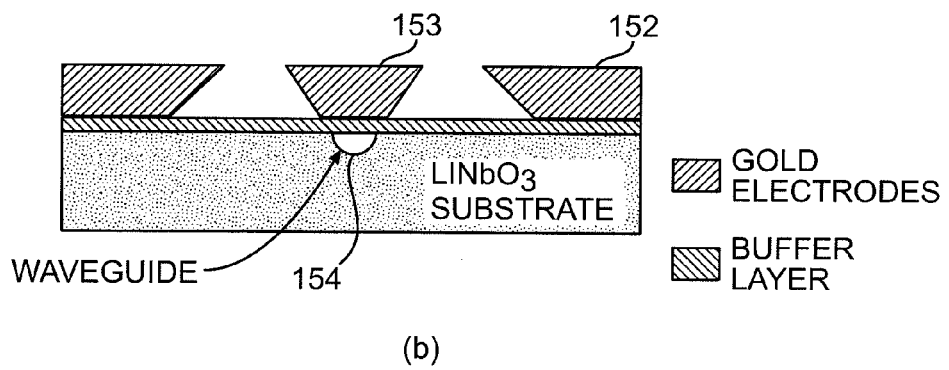
(a) EXAMPLE LAYOUT OF PHASE MODULATOR ELECTRODES
(b) EXAMPLE CROSS SECTION OF PHASE MODULATOR
*FIG. 11*

ANALOG RADIO FREQUENCY TRANSPORT OVER OPTICAL MEDIA USING CONTINUOUS OPTICAL PHASE MODULATION AND NONCOHERENT DETECTION

GOVERNMENT RIGHTS STATEMENT

This invention was made with Government support under Contract N00024-09-C-4152 awarded by the Department of the Defense/Navy. The Government has certain rights in the invention.

BACKGROUND OF THE INVENTION

In many applications there is a need to transport a wide band RF signal in a context where space and external power are either limited or not available. Modulating an optical carrier with the wide band signal and transmitting the modulated carrier over a propagation path to a receiver is a widely applied technique. While conversion of an analog signal to digital form is also quite common in some applications, the current state of the art does not easily address sampling frequencies greater than 1 GHz along with high resolution. This is a significant disincentive to the use of digital technology. There are applications of RF transport which transport the RF signal in analog form. Examples are found in U.S. Pat. Nos. 5,253,309; 6,115,162; 6,510,255; 6,643,417; 6,996,345 and 7,660,491 as well as in US Patent Publication 2003/0030868 and LaGasse et al, "Bias-Free High Dynamic-Range Phase-Modulated Fiber-Optic Link" appearing in *IEEE Photonics Technology Letters*, v #9, #5, May 1997, pp 681-683.

Maintaining linearity in the transport process (i.e., especially in carrying out modulation and demodulation processes) is important for transporting the wide band signal with favorable Spur-Free Dynamic Range (SFDR). Some RF transport schemes use coherent modulation employing Mach-Zehnder (M-Z) interferometric technology or similar. Likewise some applications use coherent demodulation with concomitant reliance on interferometric technology.

SUMMARY OF THE INVENTION

As will be described, several embodiments of the invention provide for transport of a wide band RF signal by phase modulating an optical carrier with the wide band RF signal and then recovering the transported wide band RF signal using a non-coherent approach to demodulation which directly recovers the frequency (not the phase) of the optical carrier. By modulating the phase of the optical carrier but detecting the optical frequency, the derivative of the original RF signal is recovered. This derivative is a faithful reproduction of the original, but with a static phase delay and an overall RF frequency response superimposed upon it. This RF frequency response represents the relative RF amplitude loss as a function of input RF frequency and is a function of not only the response caused by taking the derivative of the original signal, but also the individual RF frequency response of the optical phase modulator and the photo-detector employed.

The conventional applications of interferometric technology include significant limitations on linearity and for that reason should be avoided where linearity is an important characteristic.

One embodiment comprises a system for transporting a wide band RF signal, the system comprising:

an optical phase modulator with an electrical input adapted to be coupled to a source of said wide band RF signal, an optical input adapted to receive a coherent narrow band optical carrier and an optical output adapted to output said optical carrier phase modulated by said wide band RF signal, a non-coherent optical detector having an optical input and an optical detector output, said optical input adapted to receive said phase modulated optical carrier, said optical detector output representing said wide band RF signal, a propagation path for coupling said optical carrier phase modulated with said wide band RF signal from said optical phase modulator to said optical input of said non-coherent optical detector, and a photo-detector having an optical input and an electrical output, said optical input of said photo-detector adapted to be coupled to said optical detector output, said electrical output of the photo-detector for providing electrical signals corresponding to said wide band RF signal.

In one embodiment the system provides for transport of the wideband RF signal from a first location to a second location. The optical phase modulator is located at the first location and the non-coherent optical detector is located at the second location. A laser may be the source of the optical carrier. In one embodiment the laser is co-located with the phase modulator, in a different embodiment the laser is co-located with the non-coherent detector and the output of the laser traverses either a free-space path or an optical fiber to couple the laser to the phase modulator.

The propagation path may comprise free space or an optical fiber or the path may comprise, in part an optical fiber and in part free space.

The RF signal may be received via an antenna allowing the RF signal to be coupled from the antenna to the phase modulator.

The non-coherent optical detector may generate an output which represents a time derivative of the signal modulating the optical carrier. This results in the original signal, with a static phase delay and a superimposed RF frequency response.

In one embodiment the non-coherent optical detector provides an optical output with amplitude related to said wideband RF signal.

In one embodiment the non-coherent optical detector is an optical discriminator.

In one embodiment the non-coherent optical detector comprises a Fiber Bragg Grating. Preferably the detector is operated in a linear region of the device's transfer function.

In another embodiment the non-coherent optical detector comprises a thin-film filter. Preferably the detector is operated in a linear region of the device's transfer function.

In still another embodiment the non-coherent optical detector comprises a band-edge modulator. Preferably the detector is operated in a linear region of the device's transfer function.

In a still further embodiment the non-coherent optical detector comprises an absorption cell. Preferably the detector is operated in a linear region of the device's transfer function.

In a still further embodiment the non-coherent optical detector comprises a semiconductor optical amplifier. Preferably the detector is operated in a linear region of the device's transfer function.

An additional embodiment may also include a source of the optical carrier such as a laser. In one particular embodiment the laser is a laser diode.

Other embodiments comprise a method for transporting a wide band RF signal where the method includes providing:

a coherent narrow band source of light, an optical phase modulator with optical input and output and an electrical input, a non-coherent optical detector with an optical input and optical output, and a photo-detector with an optical input and an electrical output, the method further including:

coupling an optical carrier from the coherent narrow band source of light to the optical input of the optical phase modulator, optically coupling the output of said optical phase modulator to the input of said non-coherent optical detector, coupling the optical output of the non-coherent optical detector to said optical input of said photo-detector, coupling a wide band RF signal for transport to an electrical input of said optical phase modulator, and conveying said wideband RF signal from an electrical output of the photo-detector.

transporting wide band RF on an optical carrier, in terms of optical communication, may require only a single carrier. Consequently the RF transportation application is compatible with systems which include multiple optical carriers in, for example, a wavelength-division multiplexing arrangement.

Accordingly in accordance with still another embodiment, the invention comprises a multi carrier system for transporting a wide band RF signal on a first carrier and other data on a second carrier, said system comprising:

an optical phase modulator with an electrical input adapted to be coupled to a source of said wide band RF signal, an optical input adapted to receive a coherent narrow band optical first carrier and an optical output adapted to output said coherent narrow band optical first carrier modulated by said wide band RF signal, a non-coherent optical detector having an optical input and an optical detector output, said optical input adapted to receive said coherent narrow band modulated optical first carrier, said optical detector output representing said wide band RF signal, a propagation path coupling said optical first carrier modulated with said wide band RF signal from said optical phase modulator to said optical input of said non-coherent optical detector, and a photo-detector having an optical input and an electrical output, said optical input of said photo-detector coupled to said optical detector output, said electrical output of the photo-detector providing electrical signals corresponding to said wide band RF signal, a plurality of data sources located along a second propagation path, a source for coupling a second optical carrier to said second propagation path, and means for coupling outputs from at least some of said data sources for carriage by said second optical carrier on said second propagation path, where said first and second propagation paths are included in a single optical fiber.

For purposes of this application a suitable optical carrier includes coherent narrow band electromagnetic energy with a frequency in a range of frequencies from about 800 nm to about 1700 nm.

Similarly, to the extent the application refers to a source of light that reference is to a coherent narrowband source of electromagnetic energy of a frequency in the range of about 800 nm to about 1700 nm.

BRIEF DESCRIPTION OF THE DRAWINGS

Several embodiments of the present invention will be described in further detail in the following portions of this specification when taken in conjunction with the attached figures of drawing. In the figures:

FIG. 1 is a schematic of an embodiment of the invention;

FIG. 2a is a schematic of the non-coherent detector component of an embodiment where the non-coherent detector is a Fiber Bragg Grating operated in a through mode and FIG. 2b plots the transfer function of the detector plotting output loss vs. wavelength;

FIG. 3a is schematic of the non-coherent detector component of an embodiment where the non-coherent detector is a Fiber Bragg Grating operated in the reflective mode and FIG. 3b plots the transfer function of the detector plotting output loss vs. wavelength;

FIG. 4a is a schematic of the non-coherent detector component of an embodiment where the non-coherent detector is a thin film filter and FIG. 4b plots the transfer function of the detector plotting output loss vs. wavelength;

FIG. 7a is a schematic of the non-coherent detector component of an embodiment where the non-coherent detector is an optical amplifier and FIG. 7b plots the transfer function of the detector plotting output gain vs. wavelength; and FIG. 8a is a schematic of the non-coherent detector component of an embodiment where the non-coherent detector is an optical fiber and FIG. 8b plots the transfer function of the detector plotting output loss vs. wavelength;

FIG. 11a is a plan view of one suitable phase modulator;

FIG. 11b is a cross-section taken on the line B-B of FIG. 11a; and

DESCRIPTION OF THE DRAWINGS

Figure 5A:
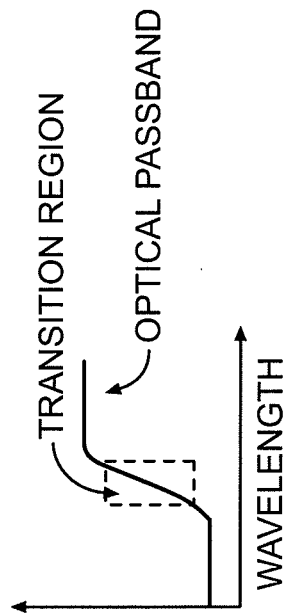
FIG. 5a is a schematic of the non-coherent detector component of an embodiment where the non-coherent detector is a Band Edge filter and FIG. 5b plots the transfer function of the detector plotting output loss vs. wavelength.

FIG. 1 is a schematic representation of one embodiment of the invention. As seen in FIG. 1 a source of an optical carrier, a laser 10, has its output directed at an optical input of a phase modulator 15 via the propagation path 45. Another input 16, to the optical phase modulator 15, receives a modulating signal input in the form of an electrical signal. That modulating signal input can be a wide band RF signal 40. While the RF signal can be provided from a variety of sources, FIG. 1 shows that in this case the source of the wide band RF signal 40 is an antenna 35. The optical output of the phase modulator 15 is the optical carrier from the laser 10 phase modulated by the amplitude of the wide band RF signal 40. That optical output is directed at a non-coherent detector 20 over propagation path 50. The non-coherent detector 20 is an optical discriminator. The discrimination function of the non-coherent detector 20 operates so that its output, coupled to photo-detector 25 over a propagation path 55, is an amplitude modulated optical carrier. The amplitude modulation of the output from non-coherent detector 20 represents instantaneous frequency of the optical carrier as perturbed by the RF signal. This amplitude modulation is a phase shifted version of the wide band RF signal 40 which was input to the phase modulator 15 at its input 16. The photo-detector 25 generates an output 30 which is a phase shifted replica of the wide band RF signal 40 originally input to the phase modulator 15 at its input 16. The propagation paths 45, 50 and 55 may be an optical fiber suitable for the optical carrier, or a free space path or a combination of optical fiber and free space path(s). In particular in one specific embodiment the laser 10 and phase modulator 15 may be incorporated into a single "package" with the free space path 45 internal to the "package".

For purposes of this description assume that the phase modulator 15 is at one location and the non-coherent detector 20 and photo-detector 25 are at a second location, displaced from the first location. The system of FIG. 1 effects transportation of the wide band RF signal 40 from its source (for example the antenna 35) to the output of the photo-detector 25 without requiring bulky microwave cables or power sources at any point from the source of the wide band RF signal 40 to the non-coherent detector 20 (aside from any power source required for the laser 10, the phase modulator 15 does not require a power source). Further, if there was a bulkhead 200 located between the wide band RF signal 40 and the non-coherent detector 20, the signal 40 could be transported through a limited aperture 201 in the bulkhead, say an aperture only large enough to pass the optical carrier (either via free space or an optical fiber). Such an aperture 201 is much smaller than would be required by microwave cables and power sources required for microwave devices. In one practical application the laser 10, modulator 15 and antenna 35 might be located on the deck or superstructure of a ship and the remaining components of FIG. 1 could be located in the interior of the ship where the bulkhead 200 surrounded or otherwise defined at least some part of the interior of the ship.

Figure 10:
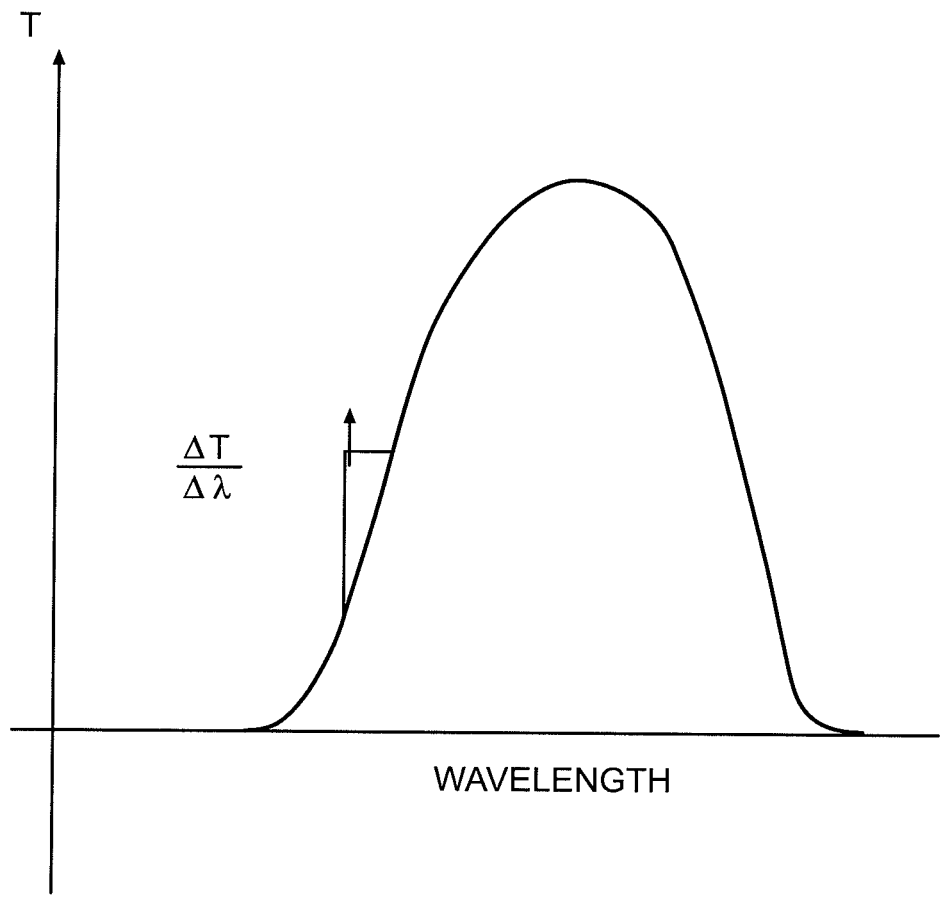
FIG. 10 is a plot of transmission vs. wavelength for a class of devices which can be used as discriminators; the figure is useful in explaining the operation of such a discriminator.

For discrimination the non-coherent detector 20 should accept an input optical signal with varying frequency (typically a limited variation over time with respect to a much larger carrier) and translate that frequency variation into an output amplitude variation. FIG. 10 shows the characteristic of a class of devices which illustrate an amplitude variation in output (T) with respect to a frequency or wavelength ($\lambda$) variation in an input. To be useful there must be a sufficient attenuation or gain within a small wavelength band for the modulation to be resolved into a detectable amplitude variation.

As seen in FIG. 1 the RF signal to be transported is used to phase modulate the optical carrier. The phase modulation also produces a related frequency modulation in the optical carrier. At the detector 20 the frequency variation of the optical carrier is translated to an amplitude variation. Since the detected frequency is the time derivative of the original modulating signal the net result is merely a small phase change in the output RF signal with respect to the original input RF signal.

The combination of optical phase modulation and non-coherent detection allows for an overall very high dynamic range and low harmonic distortion. This is, in part due to the extremely linear phase modulation, for which there is no practical dynamic range limitations. The technique allows for increased RF response as the modulation frequency increases which is in direct contrast to the frequency performance of a typical copper cable. Thus this characteristic may be used for equalization purposes at higher frequencies. This feature is a result of the detection of the modulating signal's time derivative and results in an approximately quadratic form of the frequency response. As a result the system may be able to improve the performance of existing communication systems.

The modulation and detection processes introduce very little noise. Signal distortion is very low because there are no non-linear elements in the modulation and transmission and the operating region of the detector is large compared to the dynamic range of the input signal. No electrical signal conditioning elements are required before the modulator input. Consequently no additional noise or distortion is introduced into the electrical domain. Unlike certain amplitude modulated systems there is no requirement for complicated bias control loops in the phase modulator.

The overall RF signal attenuation is governed by a combination of the phase modulator's drive voltage, the slope of the active area of the discriminator and the responsivity characteristics of the photodiode.

The laser 10 may be a laser diode such as a Distributed Feedback (DFB) or Fabry Perot (FP) laser diode. The phase modulator may employ the linear opto-electric effect to phase modulate an optical carrier. FIG. 11a is a plan view of one suitable phase modulator 15 fabricated on a Lithium Niobate substrate. FIG. 11b is a cross-section taken on the line B-B of FIG. 11a. The modulator 15 has a single straight waveguide 154 surrounded by electrodes 152/153 which are driven by the wide band RF signal from the source 35. The optical carrier from the laser 10 is input to the waveguide 154 and is phase modulated by the RF signal applied to the electrodes 152/153. The phase modulator output is coupled to the propagation path 50. Other suitable phase modulators are available from Covega Corp., particularly their Mach-10 053/065: 10 G Phase Modulator and the Mach-40 027/066: 40 Gb/s Phase Modulator. The photo-detector 25 may comprise a PIN integrated Trans-Impedance Amplifier or an Avalanche photo-diode. Both devices are well known in the art.

Figure 12:
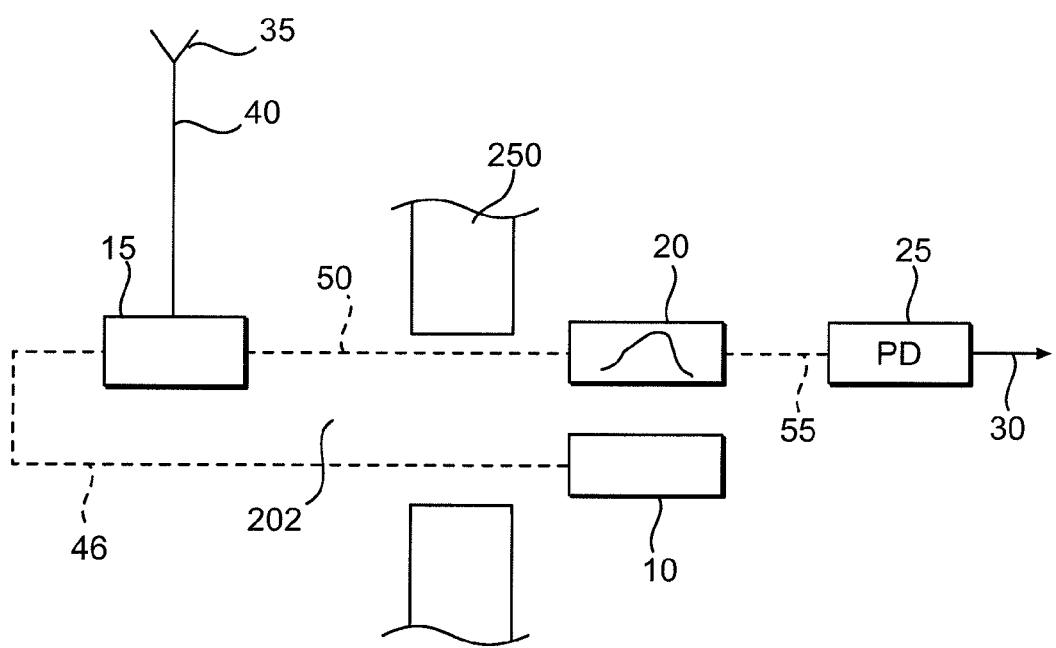
FIG. 12 is a schematic of a different embodiment of the invention in which the laser 10 and discriminator 20/photo-detector 25 are co-located.

FIG. 12 is a schematic of a different embodiment in which the laser 10, discriminator 15 and photo-detector 25 are co-located in a first location which is different from the location of the phase modulator 15. In this case the coherent narrow-band light from the laser 10 travels the propagation path 46 through an aperture 202 in the bulkhead 200.

FIG. 2a is a schematic of the non-coherent detector and phase detector of one embodiment where the non-coherent detector is a Fiber Bragg Grating 120 operated in the through mode. FIG. 2b is a plot of the Optical Loss vs. Wavelength for the Fiber Bragg Grating 120. FIG. 2b shows that the loss has a linear or near linear transition region (within the dotted outline). In this region the optical loss varies linearly with wavelength (frequency) and so the detector 120 generates an output which has an amplitude related to frequency. A key feature for all discriminators it that they must be operated so there is no ambiguity. The characteristic of FIG. 2b shows two transition regions. If there is too great a wavelength excursion, then different portions of the signal may fall in both transition regions; as a result two different wavelengths will experience the same loss and produce the same modulation. This should be avoided as is well known by properly selecting the operating point and limiting the wavelength excursion so the resulting output has no ambiguity.

FIG. 3a is a schematic of the non-coherent detector and phase detector of an embodiment where the non-coherent detector is a Fiber Bragg Grating 220 operated in the reflective mode. In the reflective mode the through mode output acts in opposition to the input. FIG. 3b shows that the loss has a linear or near linear transition region (within the dotted outline). Comparing FIGS. 2b and 3b shows that the curve of FIG. 3b is the complement of the curve of FIG. 2b. In the linear region the optical loss varies linearly with wavelength (frequency) and so the detector 220 generates an output which has an amplitude related to frequency.

FIG. 4a is a schematic of the non-coherent detector and phase detector of an embodiment where the non-coherent detector is a thin film filter 320. FIG. 4b shows a plot of optical loss of the thin film filter 320 vs. wavelength (frequency). FIG. 4b shows that the loss has a linear or near linear transition region (within the dotted outline). In this region the optical loss varies linearly with wavelength (frequency) and so the detector 320 generates an output which has an amplitude related to frequency. In particular the amplitude is related to the optical frequency which has been perturbed by the RF input to the modulator.

Figure 5B:
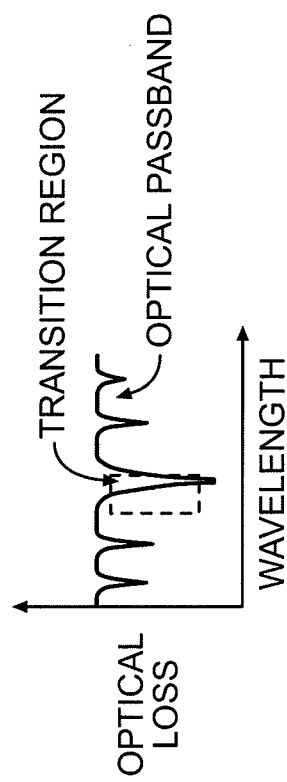

FIG. 5a is a schematic of the non-coherent detector and phase detector of an embodiment where the non-coherent detector is a Band Edge filter 420. FIG. 5b shows a plot of optical loss of the Band Edge filter 420 vs. wavelength (frequency). FIG. 5b shows that the loss has a linear or near linear transition region (within the dotted outline). In this region the optical loss varies linearly with wavelength (frequency) and so the detector 420 generates an output which has an amplitude related to frequency, especially within the linear region of the transfer function.

Figure 6A:
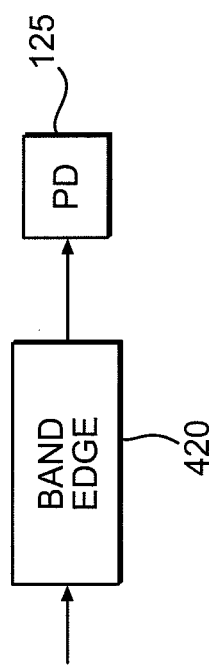
FIG. 6a is a schematic of the non-coherent detector component of an embodiment where the non-coherent detector is an Absorption Cell and FIG. 6b plots the transfer function of the detector plotting output loss vs. wavelength.
Figure 6B:
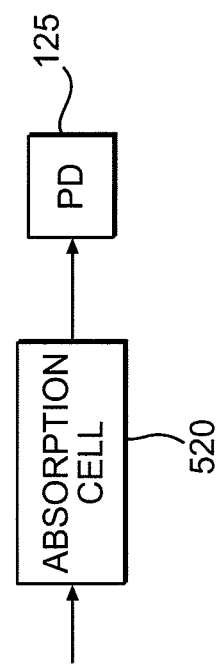

FIG. 6a is a schematic of the non-coherent detector and phase detector of an embodiment where the non-coherent detector is an Absorption cell 520. FIG. 6b shows a plot of optical loss of the Absorption cell 520 vs. wavelength (frequency). FIG. 6b shows that the loss has a linear or near linear transition region (within the dotted outline). In this region the optical loss varies linearly with wavelength (frequency) and so the detector 520 generates an output which has an amplitude related to frequency.

FIG. 7a is a schematic of the non-coherent detector and phase detector of an embodiment where the non-coherent detector is an Optical Amplifier 620. FIG. 7b shows a plot of optical gain of the Optical Amplifier 620 vs. wavelength (frequency). FIG. 7b shows that the loss has a linear or near linear transition region (within the dotted outline). In this region the optical gain varies linearly with wavelength (frequency) and so the detector 620 generates an output which has an amplitude related to frequency.

FIG. 8a is a schematic of the non-coherent detector and phase detector of an embodiment where the non-coherent detector is an Optical fiber 720. FIG. 8b shows a plot of optical loss of the Optical fiber 720 vs. wavelength (frequency). FIG. 8b shows that the loss has linear or near linear transition regions (within the dotted outlines). In these regions the optical loss varies linearly with wavelength (frequency) and so the detector 720 generates an output which has an amplitude related to frequency.

Figure 9A:
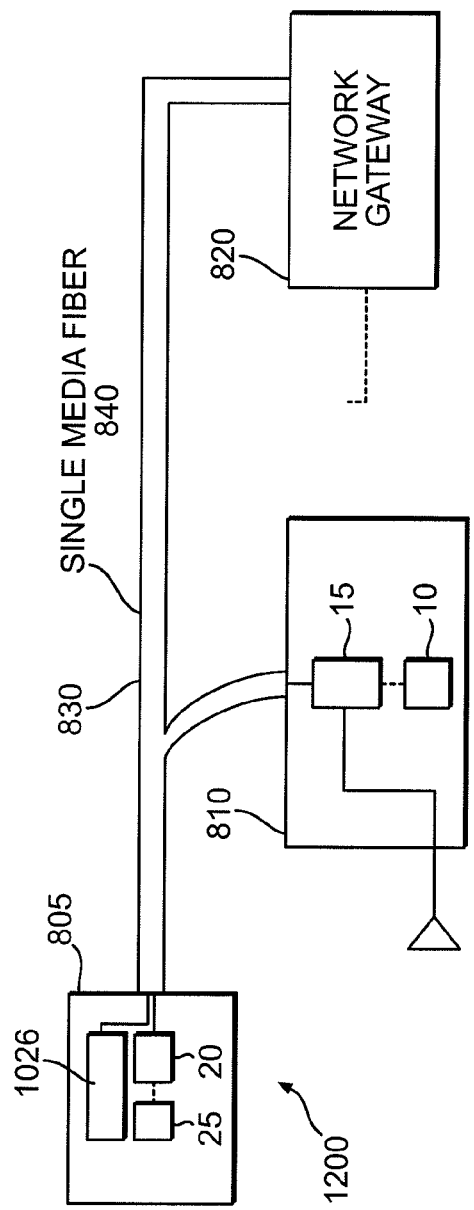
FIG. 9a is a plan view of a network 1200 illustrating an application of one embodiment of the invention in a wavelength division multiplexing environment which includes a controller 805 and plural gateways 810 and 820 coupled by a single media fiber 840.

Transporting wide band RF on an optical carrier, in terms of optical communication, may require only a single carrier. Consequently the RF transportation function is compatible with systems which include multiple optical carriers in, for example, a wavelength-division multiplexing arrangement. Such a multiple optical carrier system is illustrated in FIG. 9a. FIG. 9a is similar to FIG. 2a of co-pending application Ser. No. 11/847,963 filed on Aug. 30, 2007 for an Inverted Passive Optical Network. The subject matter of application Ser. No. 11/847,963 is incorporated herein by this reference.

Figure 9B:
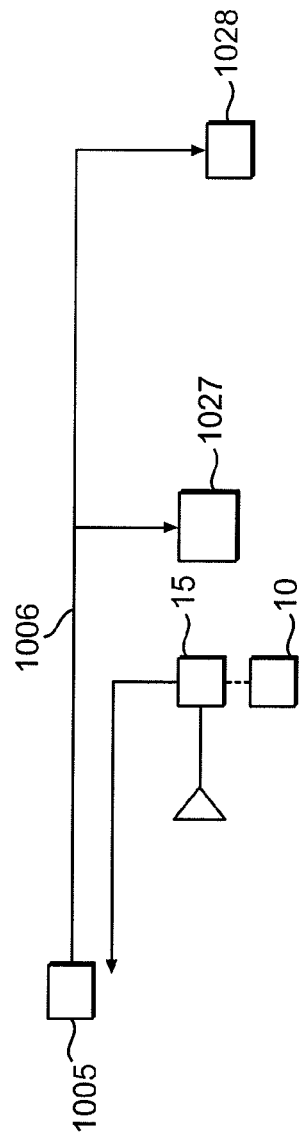
FIG. 9b schematically illustrates the optical signals transported on the fiber 840 including a first optical carrier 1011 with a source 10 located at gateway 810 and a sink located at the controller 805 and a second optical carrier 1006 with a source/sink 1005 at controller 805 and interacting with data sources at gateways 810 and 820.

As seen in FIGS. 9a and 9b a multi-carrier system includes controller 805 and a plurality of gateways 810 and 820. It should be apparent that the number of gateways shown in FIGS. 9a and 9b is exemplary and could be increased by those skilled in the art.

The system illustrated in FIGS. 9a and 9b includes at least two optical carriers, one (1006) serving to collect data from plural gateways for storage/processing at the controller 805. Another carrier (1011) serving to transport a wideband RF signal from antenna 35 at gateway 810 to the controller 805.

Controller 805 includes a non-coherent discriminator 20 and photo-detector 25 coupled to detect an optical carrier 1011 from the Single media fiber 840. Controller 805 also includes additional equipment 1026 including a source of an additional optical carrier 1006 and equipment 1026 to detect and process signals received from the fiber 840 on this additional carrier. Gateway 810 includes a laser 10 and phase modulator 15 with an input terminal coupled to receive a wide band RF signal from antenna 35. As seen in FIG. 9b the output of modulator 15 is the carrier 1011 which is transported on the fiber 840 to the detectors 20/25 at the controller 805. The other optical carrier 1006 is sourced at the equipment 1026 at the controller 805. The carrier 1006 interacts in the gateway with equipment 810, 820, etc. to serve as a (digital) carrier for transporting data originating at one or another of the gateways back to the controller 805. In particular data sourced at the gateway is multiplexed onto the carrier 1006 for transport to the controller 805. A fiber coupler 830 serves to merge, into a single stem, the two branches of the fiber 840 which respectively connect to the gateways 810 and 820. Another fiber coupler 830 (not shown) is located in the controller 805 to merge the propagation paths originating in the additional equipment 1026, on the one hand, and the discriminator 20 on the other hand.

In the referenced application a carrier source was located at a head end of a network, the carrier traversed essentially the entire network, turned around and picked up data at a gateway and was then transmitted on toward the head end. While that is an acceptable model for this invention, the invention will also work with an optical carrier sourced at one terminus of a network and which is transmitted to another terminus, where the carrier picks up data from a given gateway as the carrier reaches that gateway for transmission onward to a terminus of the network.

Thus FIGS. 9a and 9b illustrate a multi carrier system 1200 for transporting a wide band RF signal on a first carrier (1011) and other data on a second carrier (1006). The system 1200 includes:

an optical phase modulator 15 with an electrical input adapted to be coupled to a source 35 of said wide band RF signal, an optical input adapted to receive a coherent narrow band optical first carrier (from laser 10) and an optical output adapted to output said coherent narrow band optical first carrier modulated by said wide band RF signal, a non-coherent optical detector 20 having an optical input and an optical detector output, said optical input adapted to receive said coherent narrow band modulated optical first carrier, said optical detector output representing said wide band RF signal, a propagation path 1011 coupling said coherent narrow band optical carrier modulated with said wide band RF signal from said optical phase modulator to said optical input of said non-coherent optical detector, and a photo-detector 25 having an optical input and an electrical output, said optical input of said photo-detector coupled to said optical detector output, said electrical output of the photo-detector providing electrical signals corresponding to said wide band RF signal, a plurality of data sources (810, 820) located along a second propagation path 1006, a controller 1026 for coupling a second optical carrier to said second propagation path, and means (1027, 1028) for coupling outputs from at least some of said data sources for carriage by said second optical carrier on said second propagation path, where said first and second propagation paths are included in a single optical fiber (840).

The various embodiments described above should be considered as merely illustrative of the present invention. They are not intended to be exhaustive or to limit the invention to the forms disclosed. Those skilled in the art will readily appreciate that still other variations and modifications may be practiced without departing from the general spirit of the invention set forth herein. Therefore, it is intended that the present invention be defined by the claims that follow.

The invention claimed is:

1. A system for transporting a wide band RF signal having a variable amplitude, said system comprising:
    an optical phase modulator with an electrical input adapted to be coupled to a source of said wide band RF signal, an optical input adapted to receive a coherent narrow band optical carrier and an optical output adapted to output said optical carrier phase modulated by said amplitude of said wide band RF signal,
    a non-coherent optical detector having an optical input and an optical detector output, said optical input adapted to receive said phase modulated optical carrier, said optical detector output representing said wide band RF signal, wherein said optical carrier is located in a linear region of a transfer function of said non-coherent optical detector and the optical signal lies within a single transition region of the transfer function;
    a propagation path coupling said optical carrier modulated with said wide band RF signal from said optical phase modulator to said optical input of said non-coherent optical detector, and
    a photo-detector having an optical input and an electrical output, said optical input of said photo-detector coupled to said optical detector output, said electrical output of the photo-detector providing electrical signals corresponding to said wide band RF signal.

2. The system of claim 1 wherein the system provides for transport of the wideband RF signal from a first location to a second location, and where the optical phase modulator is located at the first location and the non-coherent optical detector is located at the second location.

3. The system of claim 1 wherein the propagation path comprises an optical fiber.

4. The system of claim 1 which further includes an antenna for generating said wide band RF signal.

5. The system of claim 1 wherein the non-coherent optical detector is an optical discriminator.

6. The system of claim 3 wherein the non-coherent optical detector generates a time derivative of the modulation of said optical carrier.

7. The system of claim 3 wherein the non-coherent optical detector is a discriminator.

8. The system of claim 3 wherein the non-coherent optical detector provides an output with amplitude related to said wideband RF signal.

9. The system of claim 3 wherein the non-coherent optical detector comprises a Fiber Bragg Grating.

10. The system of claim 3 wherein the non-coherent optical detector comprises a thin-film filter.

11. The system of claim 3 wherein the non-coherent optical detector comprises a band-edge filter.

12. The system of claim 3 wherein the non-coherent optical detector comprises an absorption cell.

13. The system of claim 3 wherein the non-coherent optical detector comprises a semiconductor optical amplifier.

14. A system for transporting a wide band RF signal having a variable amplitude, said system comprising:
    a coherent narrow band source of light,
    an optical phase modulator with an electrical input adapted to be coupled to a source of said wide band RF signal, an optical input adapted to receive an optical carrier from said coherent narrow band source of light and an optical output adapted to output said optical carrier phase modulated by said amplitude of said wide band RF signal,
    a non-coherent optical detector having an optical input and an optical detector output, said optical input adapted to receive said optical carrier phase modulated by said wide band RF signal, said optical detector output representing said wide band RF signal, wherein said optical carrier is located in a linear region of a transfer function of said non-coherent optical detector and the optical signal lies within a single transition region of the transfer function;
    a propagation path coupling said optical carrier phase modulated with said wide band RF signal from said optical phase modulator to said optical input of said non-coherent optical detector, and
    a photo-detector having an optical input and an electrical output, said optical input of said photo-detector coupled to said optical detector output, said electrical output of the photo-detector providing electrical signals corresponding to said wide band RF signal.

15. The system of claim 14 wherein the system provides for transport of the wideband RF signal from a first location to a second location, and where the optical phase modulator is located at the first location and the non-coherent optical detector is located at the second location.

16. The system of claim 14 wherein the propagation path comprises an optical fiber.

17. The system of claim 14 which further includes an antenna for generating said wide band RF signal.

18. The system of claim 16 wherein the non-coherent optical detector is an optical discriminator.

19. The system of claim 16 wherein the non-coherent optical detector generates a time derivative of the modulation of said optical carrier.

20. The system of claim 16 wherein the non-coherent optical detector provides an output with amplitude related to said wideband RF signal.

21. The system of claim 16 wherein the non-coherent optical detector comprises a Fiber Bragg Grating.

22. The system of claim 16 wherein the non-coherent optical detector comprises a thin-film filter.

23. The system of claim 16 wherein the non-coherent optical detector comprises a band-edge filter.

24. The system of claim 16 wherein the non-coherent optical detector comprises an absorption cell.

25. The system of claim 16 wherein the non-coherent optical detector comprises a semiconductor optical amplifier.

26. The system of claim 16 wherein the laser is a near infra-red laser.

27. The system of claim 16 wherein the coherent narrowband source of light is a laser and wherein the laser is located at the first location.

28. The system of claim 16 wherein the coherent narrowband source of light is a laser and wherein the laser is located at the second location.

29. A method for transporting a wide band RF signal having a variable amplitude, said method comprising:
providing:
a coherent narrow band source of light,
an optical phase modulator with optical input and output and an electrical input,
a non-coherent optical detector with an optical input and optical output, and
a photo-detector with an optical input and an electrical output,
coupling an optical carrier from the coherent narrow band source of light to the optical input of the optical phase modulator,
coupling said wide band RF signal for transport to the electrical input of the optical phase modulator;
optically coupling the output of said optical phase modulator to the input of said non-coherent optical detector, said output comprising said optical carrier phase modulated by said amplitude of said wide band RF signal, wherein said optical carrier is located in a linear region of a transfer function of said non-coherent optical detector and the optical signal lies within a single transition region of the transfer function;
coupling the optical output of the non-coherent optical detector to said optical input of said photo-detector, and
conveying a wideband RF signal from an electrical output of the photo-detector.

30. The method of claim 29 wherein the wide band RF signal is transported from a first location to a second location, wherein the optical phase modulator is positioned at the first location and the non-coherent optical detector is positioned at the second location.

31. The method of claim 29 wherein an optical fiber provides an optical coupling path from the output of said phase modulator to the input of the non-coherent detector.

32. The method of claim 29 wherein the non-coherent optical detector is a discriminator.

33. The method of claim 29 wherein the non-coherent detector provides an output with amplitude related to said wideband RF signal.

34. The method of claim 29 wherein the non-coherent detector comprises a Fiber Bragg Grating.

35. The method of claim 29 wherein the non-coherent detector comprises a thin-film filter.

36. The method of claim 29 wherein the non-coherent detector comprises a band-edge filter.

37. The method of claim 29 wherein the non-coherent detector comprises an absorption cell.

38. The method of claim 29 wherein the non-coherent detector comprises a semiconductor optical amplifier.

39. The method of claim 31 wherein the wide band RF signal is transported from a first location to a second location, wherein the optical phase modulator is positioned at the first location and the non-coherent optical detector is positioned at the second location.

40. The method of claim 39 wherein the coherent narrow band source of light is positioned at the first location.

41. The method of claim 39 wherein the coherent narrow band source of light is positioned at the second location.

42. The method of claim 41 which further includes a further optical fiber providing a coupling path from the output of said coherent narrow band source of light to the optical input of the optical modulator.

43. A multi carrier system for transporting a wide band RF signal having a variable amplitude on a first carrier and other data on a second carrier, said system comprising:
an optical phase modulator with an electrical input adapted to be coupled to a source of said wide band RF signal, an optical input adapted to receive a coherent narrow band optical first carrier and an optical output adapted to output said optical first carrier modulated by said amplitude of said wide band RF signal,
a non-coherent optical detector having an optical input and an optical detector output, said optical input adapted to receive said modulated optical first carrier, said optical detector output representing said wide band RF signal, wherein said optical first carrier is located in a linear region of a transfer function of said non-coherent optical detector;
and the optical signal lies within a single transition region of the transfer function a propagation path coupling said modulated optical first carrier from said optical phase modulator to said optical input of said non-coherent optical detector, and
a photo-detector having an optical input and an electrical output, said optical input of said photo-detector coupled to said optical detector output, said electrical output of the photo-detector providing electrical signals corresponding to said wide band RF signal,
a plurality of data sources located along a second propagation path,
a controller for coupling a second optical carrier to said second propagation path, and
means for coupling outputs from at least some of said data sources for carriage by said second optical carrier on said second propagation path, where said first and second propagation paths are included in a single optical fiber.

44. The system of claim 43 wherein the system provides for transport of the wideband RF signal from a first location to a second location, and where the optical phase modulator is located at the first location and the non-coherent optical detector is located at the second location.

45. The system of claim 43 which further includes an antenna for generating said wide band RF signal.

46. The system of claim 43 wherein the non-coherent optical detector is an optical discriminator.

47. The system of claim 44 wherein the non-coherent optical detector generates a time derivative of the modulation of said optical carrier.

48. The system of claim 44 wherein the non-coherent optical detector is a discriminator.

49. The system of claim 44 wherein the non-coherent optical detector provides an output with amplitude related to said wideband RF signal.

50. The system of claim 44 wherein the non-coherent optical detector comprises a Fiber Bragg Grating.

51. The system of claim 44 wherein the non-coherent optical detector comprises a thin-film filter.

52. The system of claim 44 wherein the non-coherent optical detector comprises a band-edge filter.

53. The system of claim 44 wherein the non-coherent optical detector comprises an absorption cell.

54. The system of claim 44 wherein the non-coherent optical detector comprises a semiconductor optical amplifier.

\* \* \* \* \*